US012007080B2

(12) United States Patent
Horaczek et al.

(10) Patent No.: US 12,007,080 B2
(45) Date of Patent: Jun. 11, 2024

(54) DEEP-DRAWN MCPCB

(71) Applicant: SIGNIFY HOLDING B.V., Eindhoven (NL)

(72) Inventors: Michal Jan Horaczek, Best (NL); Martinus Arnoldus Cornelis Heijmans, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/031,633

(22) PCT Filed: Oct. 7, 2021

(86) PCT No.: PCT/EP2021/077654
§ 371 (c)(1),
(2) Date: Apr. 13, 2023

(87) PCT Pub. No.: WO2022/078860
PCT Pub. Date: Apr. 21, 2022

(65) Prior Publication Data
US 2023/0383914 A1 Nov. 30, 2023

(30) Foreign Application Priority Data
Oct. 13, 2020 (EP) .................................... 20201463

(51) Int. Cl.
*F21K 9/238* (2016.01)
*F21V 19/00* (2006.01)
(Continued)

(52) U.S. Cl.
CPC ............ *F21K 9/238* (2016.08); *F21V 19/004* (2013.01); *F21V 23/005* (2013.01); *F21V 29/503* (2015.01)

(58) Field of Classification Search
CPC ........ F21K 9/238; F21K 9/232; F21V 19/004; F21V 23/005; F21V 29/503
See application file for complete search history.

(56) References Cited

U.S. PATENT DOCUMENTS

2012/0182737 A1* 7/2012 Kuenzler .............. F21V 19/003 362/249.02
2015/0109791 A1 4/2015 Johnston et al.
(Continued)

FOREIGN PATENT DOCUMENTS

CN 102483200 A * 5/2012 ............... F21K 9/00
CN 104676544 A 6/2015
(Continued)

*Primary Examiner* — Erin Kryukova

(57) ABSTRACT

The invention provides a light generating device (1000) comprising (i) a light source (100), wherein the light source comprises a solid state light source, (ii) a support (200) for the light source (100), (iii) a housing (300) comprising a housing wall (310), and (iv) a thermally conductive element (400); wherein the support (200) is a monolithic support, wherein the support (200) comprises at least two support parts (210) which are configured bent relative to each other, wherein a first support part (211) of the at least two support parts (210) is configured to support the light source (100), and wherein a second support part (212) of the at least two support parts (210) is associated to one or more of the housing wall (310) and the thermally conductive element (400) and configured in thermal contact with the thermally conductive element (400), wherein the support (200) is thermally conductive.

12 Claims, 2 Drawing Sheets

(51) Int. Cl.
*F21V 23/00* (2015.01)
*F21V 29/503* (2015.01)

(56) References Cited

U.S. PATENT DOCUMENTS

| | | | |
|---|---|---|---|
| 2015/0308674 | A1 | 10/2015 | Hsiao et al. |
| 2016/0025276 | A1 | 1/2016 | Fu et al. |

FOREIGN PATENT DOCUMENTS

| | | | | | |
|---|---|---|---|---|---|
| CN | 204648171 | U | * | 9/2015 | |
| CN | 204648171 | U | | 9/2015 | |
| CN | 206656169 | U | | 11/2017 | |
| CN | 206918689 | U | * | 1/2018 | |
| CN | 107917349 | A | | 4/2018 | |
| CN | 209431118 | U | | 9/2019 | |
| JP | 5167358 | B2 | | 3/2013 | |
| JP | 2014096229 | A | * | 5/2014 | |
| WO | WO-2014010141 | A1 | * | 1/2014 | ............ F21K 9/232 |
| WO | 2016154156 | A1 | | 9/2016 | |
| WO | 2017029147 | A1 | | 2/2017 | |

* cited by examiner

DEEP-DRAWN MCPCB

CROSS-REFERENCE TO PRIOR APPLICATIONS

This application is the U.S. National Phase application under 35 U.S.C. § 371 of International Application No. PCT/EP2021/077654, filed on Oct. 7, 2021, which claims the benefit of European Patent Application No. 20201463.5, filed on Oct. 13, 2020. These applications are hereby incorporated by reference herein.

FIELD OF THE INVENTION

The invention relates to a light generating device and to a method for producing such light generating device.

BACKGROUND OF THE INVENTION

Light emitting diode spotlights are known in the art. US2016/0025276, for instance, describes a light emitting diode (LED) spotlight comprising a housing, a driver, a cover, a base, an LED substrate, and a lampshade. The housing has an accommodation portion and an opening, the driver is disposed in the accommodation portion, the cover covers the opening. The housing has a plurality of support arms disposed thereon, and the base supports the plurality of support arms. The base has a heat dissipating surface, on which the LED substrate is disposed. The lampshade covers the base and is located on a light-emitting surface of the LED substrate. The distance between the base and the cover is 20-50% of the height of the LED spotlight.

WO 2016/154156 A1 discloses glass jacketed led lamp. The glass jacketed led lamp is characterized by a prismatic LED module positioned coaxial to the axis of a cylindrical glass jacket having an inside diameter. The LED module comprises a prismatic LED carrier structure having N longitudinal sides, and LEDs that are operationally mounted on at least one of the N sides. The carrier structure was formed by folding a single metal core printed circuit board (MCPCB) into a convex prismatic polyhedron. The prism cross section is an irregular and incomplete polygon such that the N sides are bounded by N+1 longitudinal fold edges, wherein a first edge and the (N+1)th edge are back edges that are spaced apart by a first separation gap.

US 2015/308674 A1 discloses a circuit board and a light emitting diode lamp having the same. The circuit board for bearing a plurality of light emitting diodes includes a base and a bent portion. The bent portion extends and bends from a lateral periphery of the base. The base and the bent portion are integrally formed. An outer surface of the bent portion resists other component to embed and fix circuit board.

SUMMARY OF THE INVENTION

A lamp design may have a PCB (printed circuit board) based light source that may be glued to a heat spreader and may be attached via a connector to a driver PCB. The heat spreader may be pressed into a lamp housing that may e.g. be made of an overmolded heatsink. Such possible design, however, needs a plurality of components and thus also needs a relatively complicated assembly process. Hence, it is an aspect of the invention to provide an alternative light generating device and/or process for producing such light generating device, which preferably further at least partly obviate(s) one or more of above-described drawbacks. The present invention may have as object to overcome or ameliorate at least one of the disadvantages of the prior art, or to provide a useful alternative.

In a first aspect, the invention provides light generating device comprising a light source. Especially, the light source comprises a solid state light source. Further, the light generating device comprises a support for the light source. Yet further, the light generating device may comprise a housing comprising a housing wall. Especially, the light generating device also comprises in embodiments a thermally conductive element. In embodiments, the support may be a monolithic support. Especially, the support comprises at least two support parts which are configured bent relative to each other. A first support part of the at least two support parts may be configured to support the light source. Further, the support may comprise a second support part. In embodiments, a second support part, of the at least two support parts, may be functionally coupled to the housing and/or the thermally conductive element. In (specific) embodiments, the second support part (of the at least two support parts) may be configured between the housing wall and the thermally conductive element or may be configured in contact with only the thermally conductive element. Configuring the second support part (of the at least two support parts) between the housing wall and the thermally conductive element has the advantage of providing improved thermal management in combination with improved ingress protection/fixation (especially when the support part and/or thermally conductive element becomes warm due to heat of the solid state light source). In specific embodiments, the support, especially the second support part may be associated to one or more of the housing wall and the thermally conductive element, especially at least the latter. Especially, in embodiments the second support part may be configured in thermal contact with the housing wall and/or the thermally conductive element. More especially, in embodiments the second support part may be configured in thermal contact with the thermally conductive element. Especially, in embodiments the support may be thermally conductive. Hence, in embodiments the invention provides a light generating device comprising (i) a light source, wherein the light source comprises a solid state light source, (ii) a support for the light source, (iii) a housing comprising a housing wall, and (iv) a thermally conductive element; wherein the support is a monolithic support, wherein the support comprises at least two support parts which are configured bent relative to each other, wherein a first support part of the at least two support parts is configured to support the light source, and wherein a second support part of the at least two support parts is associated to one or more of the housing wall and the thermally conductive element and configured in thermal contact with the thermally conductive element, wherein the support is thermally conductive.

Such device may e.g. comprise less components, as e.g. a separate heat spreader may not be necessary. Further, the device may comprise less components as relevant components can be fixated in the housing while these component do not have to be assembled beforehand. In embodiments, all electronic components may be available on the same support, such as an MCPCB (see further also below). Further, the present device provides improved thermal management (in combination with improved ingress protection/fixation). Further, with the present device thermal contact with the housing wall may be relatively high. Hence, in a simple way heat from the light source may be dissipated to the housing wall. Especially, the first support part is associated to a second support part. In embodiments, the latter does not comprise electronic components. Further, especially the second support part may be thermally coupled to the housing wall. In this way, the first support part can transfer heat to the adjacent second support part, which can transfer heat to the housing wall (while in embodiments not producing heat itself, as it may not comprise a light source or other electronic components).

As indicated above, the light generating device comprising (i) a light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3:Cr^{3+}$), thulium YAG (Tm:YAG) laser, titanium sapphire (Ti:sapphire; $Al_2O_3:Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). In embodiments, the light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin.

In embodiments, the light source may especially be configured to generate light source light having an optical axis (O), (a beam shape) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

In embodiments, the light source is configured to generate white light. In yet further embodiments, a plurality of light sources may be applied, which may in an operational mode of the plurality of light sources generate white light. Hence, the device light may in embodiments be white light and may in other embodiments be colored light. Further, in specific embodiments the device light is white light in an operational mode of the light generating device.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

Especially, the light generating device is configured to generate visible light. The terms "visible", "visible light" or "visible emission" and similar terms refer to light having one or more wavelengths in the range of about 380-780 nm. In specific embodiments, the light generating device may also be configured to generate infrared radiation, e.g. for communication (e.g. LiFi).

In specific embodiments, the light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually.

As indicated above, especially the light source may comprise a solid state light source. The light source may in embodiments comprise a luminescent material, configured to convert light from e.g. a solid state light source in luminescent material light. Hence, the device may be configured to generate device light, wherein the device light may comprise one or more of solid state light source light and luminescent material light. The terms "luminescent material" and "luminescent material light", and similar terms, may also refer to different types of luminescent with respective luminescent material light having different spectral power distributions. The luminescent material may be provided as layer on a solid state light source (die) or may be configured remote from the solid state light source (die). As also indicated below, a combination of different embodiments may also be applied.

As indicated above, in embodiments the device may be configured to generate white light. However, in other embodiments the device may be configured to generate colored light. When the device comprises a plurality of light sources, which may in embodiment essentially be the same light sources and which may in other embodiments comprise different light sources, the light source(s) may also be controlled, i.e. especially solid state light source(s) may be controlled. To this end, the device may comprise a control system, which may be supported by the support, or the device may be functionally coupled to a control system.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the control system, but may be (temporarily) functionally coupled to the control system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Further, the device comprises a support for the light source. The support comprises at least two support parts least two support parts. Especially, the support is a monolithic support. Hence, the first support part and the one or more second support parts may be comprised by a single body.

In embodiments, a first support part of the at least two support parts is configured to support the light source. The term "first support part" may in specific embodiments also refer to a plurality of (different) first support parts.

In further embodiments, a second support part of the at least two support parts may be configured in thermal contact with the housing wall and/or the thermally conductive element, especially at least the thermally conductive element. The term "second support part" may in embodiments also refer to a plurality of second support parts. At least one of the second support parts may be configured in thermal contact with the housing wall and/or the thermally conductive element, especially at least the thermally conductive element. Further, at least one first support part and at least one second support part are configured bent relative to each other. When there more than one first support parts and/or when there are more than one second support parts, in embodiments all second support parts may be configured bent relative to one or more first support parts. Especially, when there are two or more second support parts, at least two of them, may be in thermal contact with the housing wall, and/or the thermally conductive element, especially at least the thermally conductive element. In general, there may be a single first support part and a single second support part, due to e.g. the deep-drawing process (see also below), leading e.g. to a monolithic element that may have the shape of a cup, with a flat bottom (or top), and a (circumferential) edge, which may have an angle ($\alpha$) unlike 180° with first support part.

Especially, the term "thermal contact" may refer to an average distance of at maximum 100 μm, even more especially at maximum 50 μm, such as yet even more especially at maximum 20 μm. The smaller the average distance, the better the thermal contact is. With full physical contact, thermal contact may be best. As indicated above, a second support part may be in thermal contact with the housing wall (or internal planar contact part comprised thereby). Especially, at least 20%, such as at least 50%, like even more especially at least 80% of such second support part may be in thermal contact with the housing wall. Further, especially at least 4 $mm^2$, like even more especially at least 16 $mm^2$, may be in thermal contact with the housing wall (or internal planar contact part comprised thereby). Even more especially, at least 20%, such as at least 50%, like even more especially at least 80% of such second support part may be in physical contact with the housing wall. Further, especially at least 4 $mm^2$, like even more especially at least 16 $mm^2$, may be in physical contact with the housing wall (or internal planar contact part comprised thereby). Larger values, however, may also be possible. Here, the percentage refer to the percentage of the surface (of one side of the support) that is in thermal or physical contact with the housing wall. Instead of the term "physical contact" also the term "mechanical contact" may be used. In especially refer to two items that touch each other.

As indicated above, the first support part and the second support part may be configured bent relative to each other (due to the deep-drawing process). This may especially indicate that the first support part and second support part are essentially comprised by a monolithic body but the two parts can be bent relative to each other. More precisely, in the light generating device the first support part and second support part are configured bent to each other. Hence, instead of an angle of 180°, the first support part and second support part are configured under an angle unequal to 180°. When the first support part and the second support part are in a planar configuration, i.e. not bent, the mutual angle may be 180°. Further, the mutual angle when bent relative to each other is thus in general not 0°, but in general within the range of larger than 0° and equal to or smaller than 180° or larger than 180° and smaller than 360°.

In specific embodiments, the mutual angle is equal to or larger than 15, such as e.g. equal to or larger than 45°, such as equal to or larger than 60°. In other specific embodiments, the mutual angle may be equal to or smaller than 350°, such as equal to or smaller than 315°, but especially equal to or larger than 195°, like at least 215°. Hence, the first support part may support at one side of the support one or more light sources, and due to the deep-drawing process, the second support part may be configured away from the support to the side of the support wherein the one or more light source are not available.

Hence, especially the mutual angle is the angle deviating from a planar (180°) configuration of two support parts. Especially, the mutual angle $\alpha$ may be selected from the range of 215-315°, such as selected from the range of 250-290°. Especially, the angle α may be about 270°, such as 270°+/−5°.

Therefore, in specific embodiments, the support may comprise a kind of one side closed cylinder, with on the closure of the cylinder one or more light sources, wherein the closure may essentially be defined by the first support part, and the cylindrical part by the second support part.

The first and second support part may be obtained by providing a monolithic support and deep-drawing the (monolithic) support into the first support part and the second support part which are configured bent relative to each other, and which still form a monolithic body (see further also below). Hence, in embodiments the support may be a deep-drawn support.

In specific embodiments, the support comprises a metal-core printed circuit board (MCPCB). Especially in this way, at least part of the support is thermally conductive. Here, it is especially referred to the metal core. The metal core may e.g. aluminum metal. Alternatively, the metal core may be copper metal.

State of the art PCBs are e.g. FR4 PCBs, which are made of epoxy resin plus filler (filler) and glass fiber. Aluminum substrate or copper substrate PCB (also MCPCB) is a kind of PCB, metal based printed board, with a high thermal conductivity and a good heat dissipation function. The general single layer MCPCB may be composed of three layers of structure, which are the circuit layer (copper foil), the insulating layer and the metal base. Further, the MCPCB may comprise a solder mask. Hence, in embodiments the MCPCB may comprise at least four layers comprising a metal core, (thereon) an electrical insulation layer ("dielectric"), (thereon) one or more electrically conductive tracks (especially copper tracks), and (thereon) a solder mask. Used for high-end use is also designed as a double-sided plate, the structure of the circuit layer, insulation layer, aluminum or copper, insulation layer, circuit layer. Very few are used as multi-layer layer, which can be made up of ordinary multilayer with insulating layer and aluminum base (or copper base).

Hence, in embodiments the support, especially at least the first support part, may comprise a support layer, which may comprise the metal core. This support layer may have a first face and a second face. On the support layer, there may be a dielectric layer and one or more electrically conductive tracks and also a solder mask. Optionally, at the other side of the support layer there may also be one or more layers (which will not further be discussed). Especially, the support layer may be a continuous layer comprised by both the first support part and the second support part, and may at least comprise the metal core.

Especially, the first support part (of the at least two support parts) may be configured to support the light source. Note that in specific embodiments, the first support part may be configured to support a plurality of (solid state) light sources. In specific embodiments, the first support part may support further electrical components (or "electronics", see further below). As indicated above, the light source may comprise a solid state light source, such as a LED or laser light source.

Especially, in embodiments any electrical components, such as the light source, a driver, a sensor, etc., supported by the support, may only be configured at a single side of the (first) support (part), especially at the side of the first face.

As indicated above, the light generating device may further comprise a housing. The housing may enclose the light source and optional electronics, like e.g. a driver. Further, in embodiments the housing may comprise a light transmissive window, which may e.g. be glass or a polymeric material, that is transmissive for the light source light of the light source. The housing may comprise a housing wall, which may consist of one or more parts. For instance, the housing wall may enclose at least part of the optional electronics, and e.g. part of the light source and/or support. At least part of the housing may (therefore) be not transmissive for the light source light. Especially, the housing may comprise at least two parts, i.e. a light transmissive part transmissive for the light source light ("window") and a part non-transmissive for the light source light. The latter part may e.g. be functionally coupled, such as physically coupled, to a screw cap, though other electrically conductive solutions may also be possible.

Further, in embodiments the light generating device may comprise a thermally conductive element. A thermally conductive element especially comprise thermally conductive material. A thermally conductive material may especially have a thermal conductivity of at least about 20 W/(m*K) (i.e. at least about $W \cdot m^{-1} \cdot K^{-1}$), like at least about W/(m*K), such as at least about 100 W/(m*K), like especially at least about 200 W/(m*K). In yet further specific embodiments, a thermally conductive material may especially have a thermal conductivity of at least about 10 W/(m*K).

In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

The thermally conductive element may comprise one or more of a heatsink and a heat spreader. Especially, the thermally conductive element may essentially consist of a heatsink. As indicated above, due to the direct contact of the support with the thermally conductive element (and/or the housing wall), a heat spreader may not be necessary anymore.

Heatsinks are known in the art. The term "heatsink" (or heat sink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heat sink is especially designed to maximize its surface area in contact with the fluid cooling medium surrounding it. Hence, especially a heatsink may comprise a plurality of fins. For instance, the heatsink may be a body with a plurality of fins extending thereof.

A heatsink especially comprises (more especially consists of) a thermally conductive material.

The term "heatsink" may also refer to a plurality of (different) heatsinks.

Heat spreaders are known in the art. A heat spreader may be configured to transfer thermal energy from a first ("hotter") element to a second ("colder") element. The second element may e.g. comprise heat sink or heat exchanger. Especially, the heat spreader comprises a passive heat spreader, such as in embodiments a plate or block of a thermally conductive material (see also elsewhere). The heat spreader may in embodiments comprise no fins.

Hence, especially the support may be in physical contact with the thermally conductive element, especially with the heatsink. Alternatively or additionally, the support may be in physical contact with the housing wall. Especially, the support is configured at least in physical contact with the thermally conductive element, especially the heatsink, and the light generating device does not comprise a separate heat spreader between the support and the thermally conductive element.

As the second support part is in thermal contact with the housing wall and/or the thermally conductive element, and as the light source if especially physically coupled to the first support part, heat can be transferred from the light source via the first support part and via the second support part to the housing wall and/or the thermally conductive element. In this way, heat may be transferred to the housing wall, and thereby to the ambient, either directly and/or indirectly via the thermally conductive element, such as a heatsink.

Hence, especially the support may be thermally conductive. As can be derived from the above, in specific embodiments the support comprises a metal-core printed circuit board (MCPCB). Further, especially the thermally conductive element comprises a heatsink or a heat spreader or both. In specific embodiments, the thermally conductive element comprises a heatsink (and does not comprise a separate heat spreader). Hence, the phrase "the support is thermally conductive" may especially indicate that the support may comprise thermally conductive material, such as a metal core.

As indicated above, in embodiments the second support part of the at least two support parts may be configured between the housing wall and the thermally conductive element. In this way, the PCB may essentially directly be introduced in the housing, without intermediate elements. The support may thus in embodiments have the function of both a support and a heat spreader. Further, especially the second support part may be configured in thermal contact with the thermally conductive element (and/or the housing wall).

Therefore, in specific embodiments the second support part may be in physical contact with the housing wall and the thermally conductive element.

By introducing the second support part for instance between the housing and the thermally conductive element, the support can be fixated in the housing. Therefore, in specific embodiments the second support part is configured in an interference fit between the housing wall and the thermally conductive element. In specific embodiments, however, the second support part may be configured in an interference fit with the thermally conductive element, especially a heatsink.

Alternatively, in specific embodiments the second support part is configured in an interference fit in the thermally conductive element. For instance, a part of the heatsink may have a cylindrical shape, wherein the support may be configured, such as in a press fit arrangement. The first support part may form a closure, and the second support part may be in (physical) contact with the wall of the cylinder. The second support part may be configured within the cylinder (see also some of the drawings) or around the cylinder.

Alternative or additional ways to fixate the support may also be possible, such as including click connections, etc.

For thermal dissipation, it may be useful when the thermally conductive element is in thermal contact with the housing wall. Especially, in embodiments at least part of the thermally conductive element has a shape conformal to a shape of the housing wall. For instance, in embodiments at least 30% of an external face of the thermally conductive element may be in thermal contact with the housing wall. Further, in embodiments at least 30% of an external face of the thermally conductive element may be essentially conformal with the housing wall.

Especially, in embodiments at least part of the thermally conductive element is in physical contact with the housing wall. Further, especially in embodiments at least 30% of an external face of the thermally conductive element may be in physical contact with the housing wall.

In embodiments, the first support may have a first support face for supporting e.g. the light source which first support face may have an area of at least about 0.5 $cm^2$, such as at least about 1 $cm^2$, such as up to about 100 $cm^2$, such as up to about 50 $cm^2$. The second support may have a length (extending from the first support) in the order of at least 0.5 mm, such as at least about 1 mm. Further, the second support may have a length (extending from the first support) in the order of up to about 8 cm, such up to about 5 cm.

Hence, in embodiments at least part of the support between the light source and the housing wall or the thermally conductive element is thermally conductive. The first support part in thermal contact with the housing wall is especially in physical contact therewith and/or in physical contact with the thermally conductive element, especially a heatsink.

As indicated above, the housing comprising a housing wall. Instead of the term "housing wall", also the term "device wall" may be applied. The housing may especially be polymeric material or ceramic material. In embodiments, the housing may be a casted element.

Though with the present invention not necessary, the housing wall (and the heatsink) may also comprise an overmolded heatsink. Especially an overmolded heatsink may be useful, as this allows an intimate contact between heatsink and housing wall. Especially, in such embodiments the second support part may be in physical contact with the heatsink. Further, no heat spreader may be necessary. For instance, the support may be configured in a press fit connection with the heatsink.

Hence, in specific embodiments the light generating device comprises an overmolded heatsink. Especially, the second support part may be in physical contact with the heatsink of the overmolded heatsink. The heatsink may be at the inner side of the housing.

As indicated above, the light source may comprise a solid state light source. For this reason, but in other embodiments also for other (control) reasons, the light generating device may further comprising electronics. In embodiments, the electronics comprise a driver. Alternatively or additionally, in embodiments wherein the electronics further optionally comprise a communication device for control of the light source. Such communication device may be based on e.g. Bluetooth, Wifi, LiFi, etc. (see also above). Especially, in embodiments the electronics are physically coupled to the first support part. Yet further, especially the electronics are functionally coupled to the light source. This functional coupling may especially imply that the electronics and the light source are in the same circuit (comprised and/or supported by the support, such as the MCPCB). Electronics may be functionally coupled to the first support part. Alternatively or additionally, electronics may be functionally coupled to a separate support. Optionally, in embodiments electronics may be functionally coupled to the second support part, though this may be a bit more complex in view of the deep-drawing process.

Hence, in embodiments the light generating device may further comprise electronics, wherein the electronics may be physically coupled to the first support part and functionally coupled to the light source, and wherein the electronics comprise a driver, and wherein the electronics further optionally comprise a communication device, e.g. for control of the light source.

Herein, instead of the term "electronics" also the term "electronic component may be applied. The electronic component may include an active or a passive electronic component. An active electronic component may be any type of circuit component with the ability to electrically control electron flow (electricity controlling electricity). Examples thereof are diodes, especially light emitting diodes (LED). LEDs are herein also indicated with the more general term solid state lighting devices or solid state light sources. Hence, in embodiments the electronic component comprises an active electronic component. Especially, the electronic component may comprise a driver. Other examples of active electronic components may include power sources, such as a battery, a piezo-electric device, an integrated circuit (IC), and a transistor. In yet other embodiments, the electronic component may include a passive electronic component. Components incapable of controlling current by means of another electrical signal are called passive devices. Resistors, capacitors, inductors, transformers, etc. can be considered passive devices. In an embodiment, the electronic component may include an RFID (Radio-frequency identification) chip. A RFID chip may be passive or active. Especially, the electronic component may include one or more of a solid state light source (such as a LED), a RFID chip, and an IC. The term "electronic component" may also refer to a plurality of alike or a plurality of different electronic components. Herein, the terms "electronics" or "electronics" may especially not refer to a (solid-state) light sources, as these are addressed as such.

In specific embodiments, the first support part has a circular shape. Especially, in such embodiments also the housing (and the heatsink) may have a circular cross-sectional shape.

In specific embodiments, a plurality of light sources may be functionally coupled to the first support part. For instance, 4-100 solid state light source may be functionally coupled to the first support part. Hence, in specific embodiments the light generating device comprises a plurality of light sources, wherein (in embodiments) the first support part has a circular shape, and wherein the first support part is configured to support the plurality of light sources. Especially, the one or more light sources are functionally coupled to the first support part (and not physically coupled to the second support parts). In specific embodiments, there is a single first support part comprising one or more light sources.

Physical contact may especially be facilitated by the fact that the support may be resilient. Especially when a metal-core PCB is applied, the second support part may be deep-drawn in such a way, that it exerts a force to the housing wall (or to the planar contact part). Hence, the support may thus be bendable, in the sense that at least the second support part and the first support part may be bent relative to each other. Further, especially the second support part and first support part may provide a resilient bent.

Especially, as indicated above, the angle $\alpha$ may in specific embodiments be selected from the range 35-350°, not including 180°, even more especially, especially 215-315°, such as selected from the range of than 250-290°. The angle is especially defined relative to a plane parallel to the first support part, wherein the angle defines the angle the second support part deviates from a planar configuration of the first support part and the second support part.

Hence, the support may in embodiments e.g. be press fit in the housing or in the heatsink.

For (further) fixation of the support, it may be beneficial to use fixating elements. For instance a first mechanical connector may slide in a second mechanical connector and be fixated. A first mechanical connector or second mechanical connector may comprise a barb, and when slided to each other, one may be fixated to the other. Hence, the housing (wall) and the support may each have a mechanical connector, which may be supplementary, to provide a connection. Hence, in embodiments the housing or the heatsink and the support comprise one or more male-female connections, wherein the support comprises one or more first mechanical connectors, wherein the housing or the heatsink comprises one or more second mechanical connectors. Especially, the one or more first mechanical connectors and the one or more second mechanical connectors provide one or more male-female connections. The mechanical connector may comprise snapper elements. The physical connector may essentially be used to provide a fixation.

In yet a further aspect, the invention also provides an element comprising a solid state light source and a support for the light source, wherein the support is especially a monolithic support, wherein the support comprises at least two support parts which are configurable bent (as a result of a deep-drawing process) relative to each other, wherein a first support part of the at least two support parts is configured to support the light source, wherein at least part of the support is thermally conductive. Especially, the element comprises a PCB, more especially a metal-core PCB, to which the solid state light source is functionally coupled. Hence, the support may comprise a metal-core printed circuit board.

Especially, the first support part and the second support part are configurable under an angle ($\alpha$) (or mutual angle), wherein in specific embodiments the angle ($\alpha$) may be selected from the range 35-350°.

The support may be provided planar, but may thus be deep-drawn as described herein. Further embodiments of the support described herein in relation to the light generating device may also apply to element per se. The element may thus be a MCPCB with at least a solid state light source.

In order to create good thermal contact and/or in order to prevent layers from cracking or delaminating and/or in order to prevent electrical contact, for at least part of the support part electrical conductive tracks and optionally the dielectric layer may be removed. Likewise, in order to create good thermal contact and/or in order to prevent layers from cracking or delaminating and/or in order to prevent electrical contact, for at least part of the part of the support that is deep-drawn, electrical conductive tracks and optionally the dielectric layer may be removed (see also below).

Therefore, in embodiments the first support part and the second support part may share a metal core, wherein the first support part further comprises a dielectric layer and one or more electrically conductive tracks, and wherein at least part of the second support part does not comprise one or more electrically conductive tracks. The support as such may have comprised over its entire area the dielectric layer and one or more electrically conductive tracks. However, at part of the support the one or more electrically conductive tracks and optionally the dielectric layer may be removed. Hence, in specific embodiments at least part of the second support part (also) does not comprise the dielectric layer. This may facilitate that that during deep drawing damages, e.g. to the one or more electrically conductive tracks and optionally the dielectric layer may be minimized or prevented. Further, this may facilitate thermal coupling with the housing wall and/or the thermally conductive element.

Hence, part of the electrically conductive tracks may be removed, to prevent electrical connection between the electrically conductive tracks on the second support part with those on the first support part, or the electrically conductive tracks on the second support part may be removed in their entirety. Likewise, this may apply for the dielectric layer. Therefore, in specific embodiments the first support part and the second support part share a metal core, wherein the first support part further and the second support part comprise a dielectric layer and one or more electrically conductive tracks, wherein at least part of the second support part does not comprise one or more electrically conductive tracks, and wherein optional available electrically conductive tracks are not electrically connected with the one or more electrically conductive tracks comprised by the first support part, and wherein optionally a discontinuity is configured between the dielectric layer of the first support part and the second support part. Ways to remove are described below.

Further, the support may comprise a solder mask. Therefore, in specific embodiments the first support part and the second support part share a metal core, wherein the first support part and the second support part comprise a dielectric layer, one or more electrically conductive tracks, and a solder mask, wherein at least part of the second support part does not comprise one or more electrically conductive tracks and the solder mask, and wherein optional available electrically conductive tracks are not electrically connected with the one or more electrically conductive tracks comprised by the first support part, and wherein optionally a discontinuity is configured between the dielectric layer of the first support part and the second support part.

Hence, the first support part may comprise part of metal core PCB, including a dielectric layer, one or more electrical conductive tracks and a solder mask, whereas the second part may also share part of the metal core, but may at least partly not comprise the solder mask and the electrically conductive tracks, and optionally also at least partly not the dielectric layer.

Hence, in specific embodiments one or more layers may be partly removed form a MCPCB leading to a MCPCB comprised by the first support part, which may be functionally coupled to e.g. a light source, such as a LED, and a second support part which may at least share in embodiments the metal core with the first support part, but of which one or more layers are at least partly removed, such as in embodiments at least part of the one or more electrically conductive tracks (and the solder mask thereon), and optionally also at least part of the dielectric layer.

Therefore, in yet a further aspect, the invention also provides a method of producing the light generating device as defined herein. Especially, in an aspect the invention provides a method for producing a light generating device, especially as defined herein, wherein the method comprises providing a light source, a support for the light source, a housing comprising a housing wall, and a thermally conductive element. Yet further, the method may comprise deep-drawing the support into the first support part and the second support part which are configured bent relative to each other. Also, the method may comprise associating the second support part to one or more of the housing wall and the thermally conductive element. Yet further, especially the method may comprise configuring the second support part in thermal contact with the thermally conductive element. In embodiments, the method may (thereby) comprise providing the light generating device. Therefore, in specific embodiments the invention provides a method for producing the light generating device according to any one of the preceding claims, wherein the method may comprise: (a) providing a light source, a support for the light source, a housing comprising a housing wall, and a thermally conductive element; (b) deep-drawing the support into the first support part and the second support part which are configured bent relative to each other; (c) associating the second support part to one or more of the housing wall and the thermally conductive element and configuring the second support part in thermal contact with the thermally conductive element; and (d) providing the light generating device.

The stage of associating may include one or more of press fitting the support (via the second support part) to the housing wall and/or the thermally conductive element, especially the heatsink. Alternatively or additionally, other ways of association may be chosen, such as with a first mechanical connector or second mechanical connector, where the second support part comprise the first or the second mechanical connector, and the housing wall or the thermally conductive element comprises the second mechanical connector or the first mechanical connector. Therefore, in specific embodiments the second support part may be associated to the one or more of the housing wall and the thermally conductive element via a press fit. Especially, in embodiments the second support part is associated to the thermally conductive element via a press fit.

Especially, deep-drawing may be a deformation process in which material is compressed and formed at the same time. During this process thickness of material subjected to the forming process may be changed.

Hence, in embodiments the deep-drawing process may be a forming process which occurs under a combination of tensile and compressive conditions. A flat sheet metal blank may be in embodiments be formed into a hollow body open on one side or in embodiments a hollow body may be formed into a hollow body with a smaller cross-section, see e.g. DIN 8584. The deep-drawing processes may comprise one or more of (i) a deep-drawing process with tools, a deep-drawing process with active means, and (iii) a deep drawing process with active energy. Especially, the former may herein be applied. Hence, in embodiments deep-drawing may be executed using rigid tools. For instance, the rigid tools may comprise a punch, die and binder.

In deep drawing, a plate holder may close after the support (blank) has been inserted. Next, the support may be clamped between the die and the binder. This process slows down the flow of the support while it is being drawn and thereby prevents wrinkles from forming under the binder. The punch may stretch the support over the die radius and forms it in the die. The amount of punch force necessary for forming may in embodiments thereby continually increased up to the lower dead center of the punch.

Whereas in pure deep drawing there may be no reduction of sheet metal thickness, forming may be achieved in stretch forming purely as a result of a decrease in sheet metal thickness.

In the sheet metal formation process, especially the deep-drawing process, in one or more stages the second support part may be formed from the not yet drawn support (a) 180°. Further, after creation of the second support part under an angle unequal to 180°, further bending and/or deep-drawing actions may be executed. In this way, the second support part may e.g. obtain a shape other than planar, but may include further parts under angles other than 180°. Hence, in specific embodiments the second support part may include different facets. In yet other embodiments, the second support part may essentially comprise a single facet.

Note that in specific embodiments also sheet metal forming processes other than deep-drawing may be applied.

The deep drawings process may be executed in one or more stages.

The deep-drawn support obtained by deep-drawing (as e.g. described herein) may also be indicated as “deep-drawn support”.

Electrical components may be provided before deep-drawing or after deep-drawing. In specific embodiments, one or more electrical components may be provided before deep-drawing and one or more electrical components may be provided after deep-drawing. Hence, in specific embodiments the method comprises: (i) providing the light source to the support before deep-drawing the support, or (ii) providing the light source to first part of the support after deep-drawing the support; and wherein the support comprises a metal-core printed circuit board.

As indicated above, before deep-drawing a discontinuity may be provided on the support in relation to the electrically conductive tracks and optionally also the dielectric layer. Therefore, in specific embodiments (of the method), wherein the first support part and the second support part share a metal core, wherein the first support part further comprises a dielectric layer and one or more electrically conductive tracks (and a solder mask), the method may (further) comprise removing at least part of the one or more electrically conductive tracks (and at least part of the solder mask), and optionally also at least part of the dielectric layer, on part of the support that is to be deep-drawn into the second support part. This may be achieved by executing one or more of lasering, pinching, milling, etching, cutting, etc.

The light generating device may have a retro shape. For instance, the light generating device may be a retrofit lamp.

The light generating device (or lighting device) may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
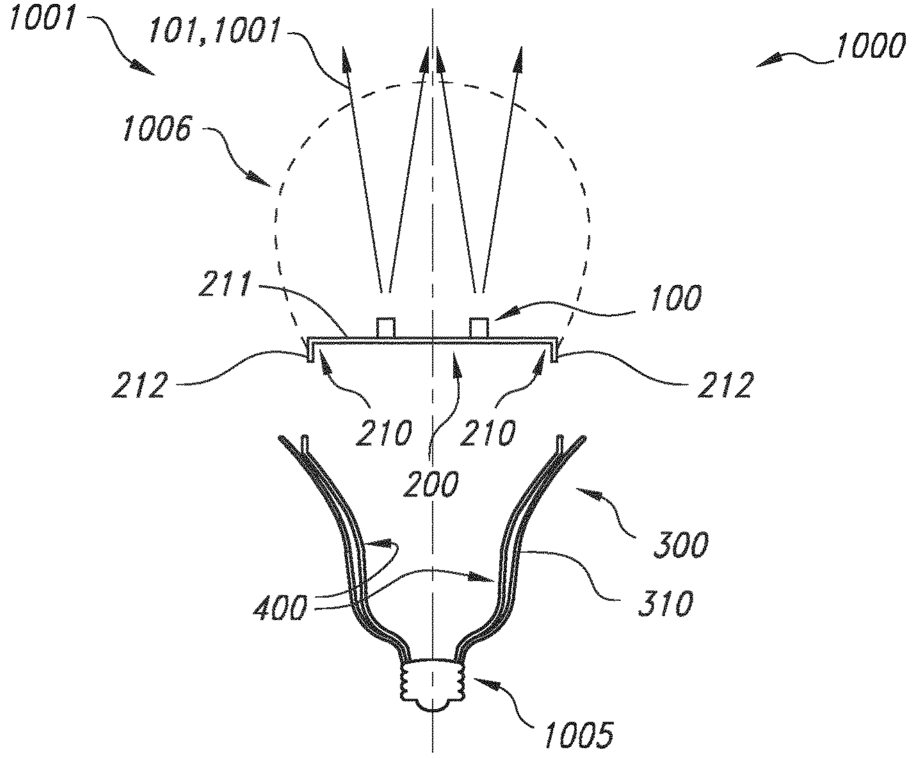
FIGS. 1*a*-1*b* schematically depict some embodiments.

FIG. 1*a* schematically depicts an embodiment of a light generating device 1000, wherein for the sake of understanding, some components are depicted at some distance of each other.

The light generating device 1000 comprises a light source 100 (here by way of example two are depicted). Especially, the light source is configured to generate light source light 101. The light generating device 1000 is configured to generate device light 1001, which may comprise, or essentially consist of the light source light 101.

In embodiments, the light source comprises a solid state light source such as a LED.

The light generating device 1000 further comprises a support 200 for the light source 100. Yet further, the light generating device 1000 comprises a housing 300 comprising a housing wall 310. Yet further, the light generating device 1000 comprises a thermally conductive element 400.

Especially, the support 200 is a monolithic support. Further, the support 200 comprises at least two support parts 210 which are configured bent relative to each other. A first support part 211 of the at least two support parts 210 is configured to support the light source 100, and a second support part 212 of the at least two support parts 210. Especially, the second support part 212 may be configured between the housing wall 310 and the thermally conductive element 400. Further, the second support part 212 may be configured in thermal contact with the thermally conductive element 400. Especially, the support 200 is thermally conductive. Especially, the second support part 212 may be in physical contact with the housing wall 310 and the thermally conductive element 400. In yet further specific embodiments, the second support part 212 may be configured in an interference fit between the housing wall 310 and the thermally conductive element 400.

Further, in embodiments at least part of the thermally conductive element 400 is in physical contact with the housing wall 310. In embodiments, at least part of the thermally conductive element 400 has a shape conformal to a shape of the housing wall 310.

In embodiments, the support 200 may comprise a metal-core printed circuit board, and wherein the thermally conductive element 400 comprises a heatsink.

Reference 1005 refers to a screw cap, like an Edison screw cap, though other similar end parts for connection with a socket may also be applied.

Reference 1005 indicates a lamp cap, like e.g. an E27 cap (of course other caps may also be possible), though other similar end parts for connection with a socket may also be applied. Reference 1006 indicates a light transmissive window, such as e.g. of PMMA or PC or glass.

Figure 1B:
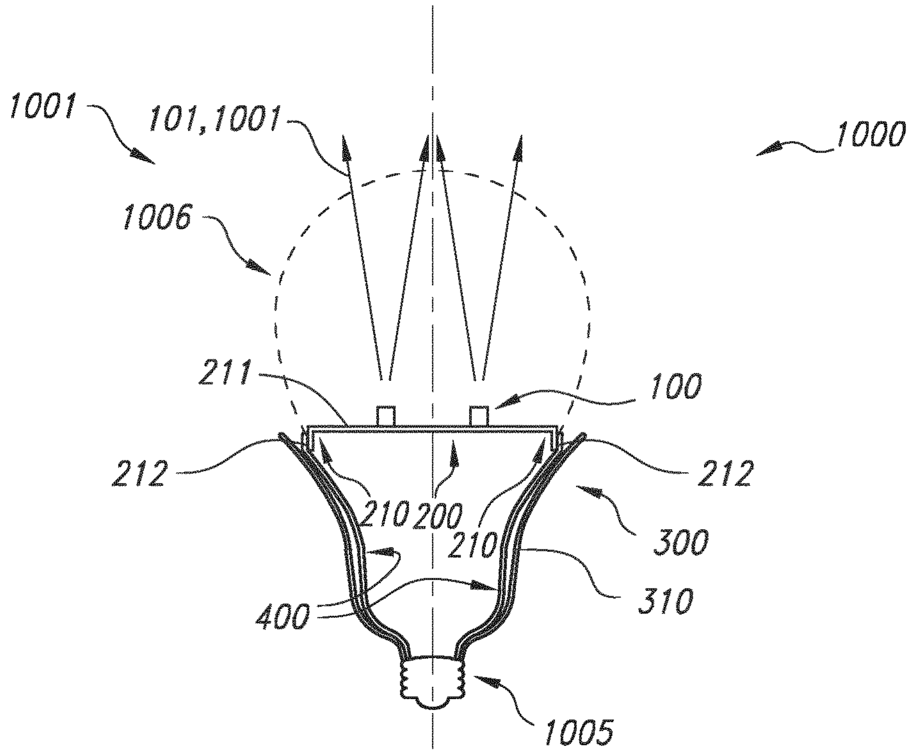

FIG. 1*b* schematically depicts the same embodiment, but with the components integrated. Note that the support 200 may essentially close the heatsink 400. The heatsink 400 may have a part having an essentially cylindrical shape, though other shapes may also be possible. The second support part 212 may be enclosed by the thermally conductive element, such as the heatsink (as shown), or may optionally enclose part of the thermally conductive element, such as the heatsink. Especially, a press fit may be chosen, though other or additional ways of fixation may also be chosen.

Hence, the light generating device 1000 may in embodiments not comprise a separate heat spreader between the support 200 and the thermally conductive element 400. Especially, the support 200 may be in physical contact with the heatsink and/or housing wall, especially in embodiments at least the former.

Referring to FIGS. 1*a*-1*b*, in specific embodiments, the device may comprise a plurality of light sources 100, wherein the first support part 211 has a circular shape, and wherein the first support part 211 is configured to support the plurality of light sources 100; wherein the light generating device 1000 is a retrofit lamp.

Especially, in embodiments the support 200 is a deep-drawn support.

Figure 2A:
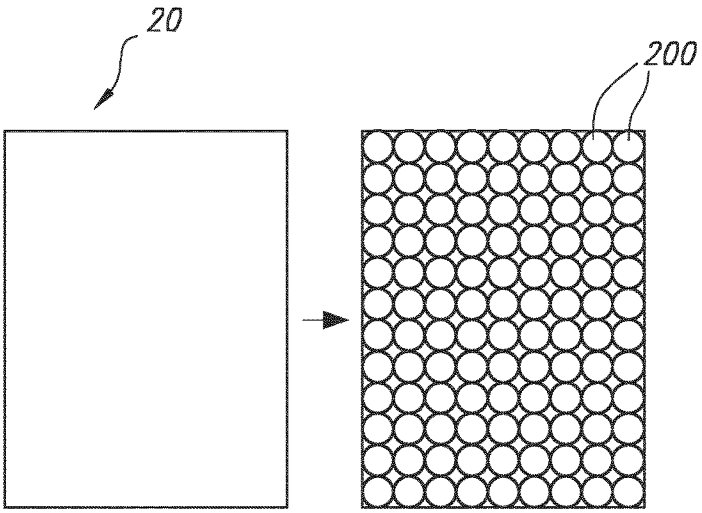
FIGS. 2*a*-2*b* schematically depict some further embodiments.

FIG. 2*a* schematically depicts how a mother PCB support 20 may be converted into a plurality of (circular) PCBs. These may be used for the support 200, which may be deep drawn, see also FIG. 2*b*.

The first support may comprise a support layer indicated with reference 219, which may comprise the metal core. This support layer may have a first face 217 and a second face 218. On the support layer, there may be a dielectric layer 204 and one or more electrically conductive tracks 203 and also a solder mask 205 (see also below). Optionally, at the other side of the support layer there may also be one or more layers (which will not further be discussed).

Figure 2B:
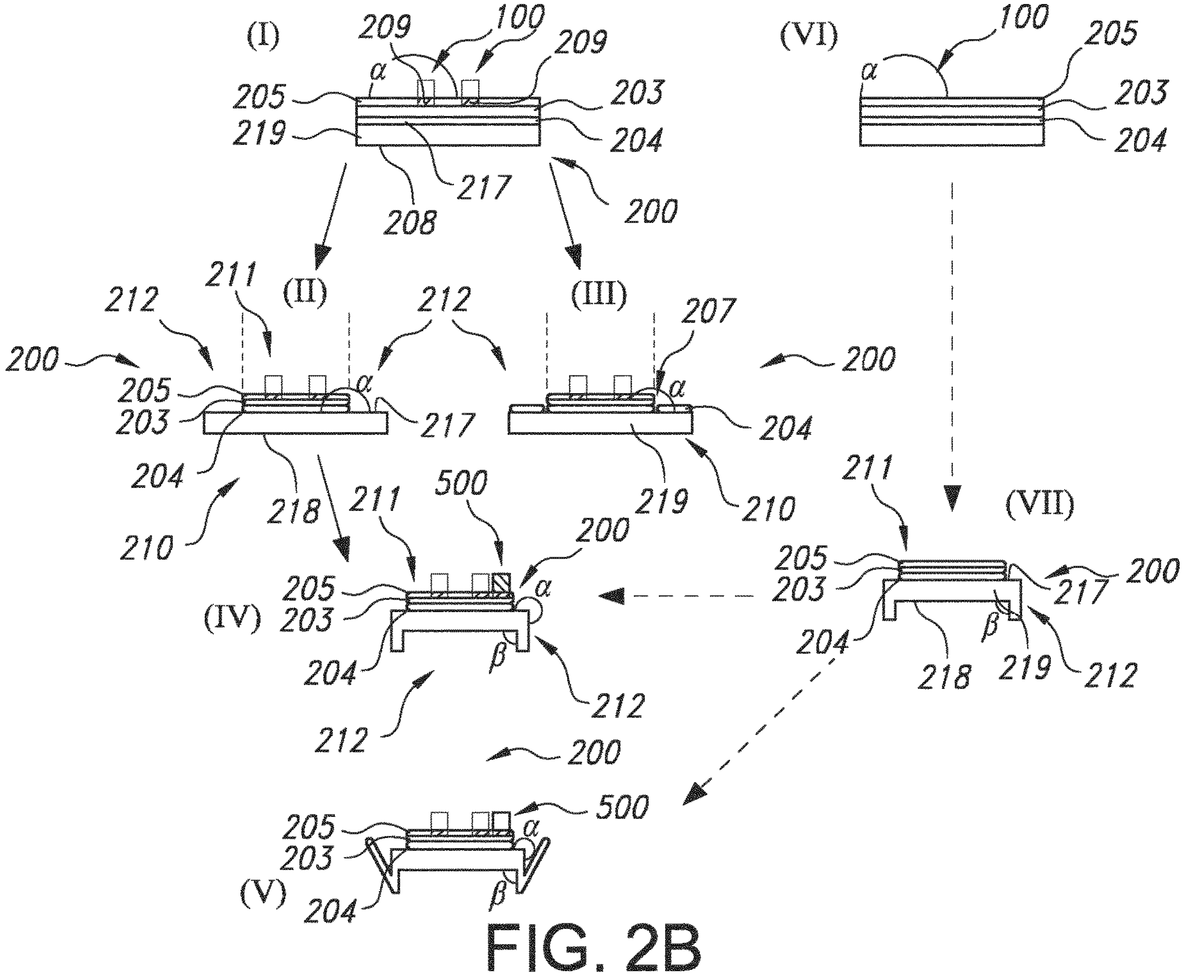

FIG. 2*b* schematically depicts an embodiment of a method for producing the light generating device 1000 such as described above.

Referring to FIG. 2*b*, but also referring to FIGS. 1*a*-1*b*, the method comprises providing a light source 100, a support 200 for the light source 100, a housing 300 comprising a housing wall 310, and a thermally conductive element 400.

In the top of FIG. 2*b*, by way of example light sources 100 are depicted (see embodiment/stage I). These may be provided before or after deep-drawing.

The method comprises deep-drawing the support 200 into the first support part 211 and the second support part 212 which are configured bent relative to each other, see embodiment/stage IV.

The method may comprise introducing the second support part 212 between the housing wall 310 and the thermally conductive element 400 and configuring the second support part 212 in thermal contact with the thermally conductive element 400 (see FIGS. 1*a*-1*b*). Thereby, the light generating device 1000 is provided.

As indicated above, the method may comprise: (a) providing the light source 100 to the support 200 before deep-drawing the support 200, or (b) providing the light source 100 to first part 211 of the support 200 after deep-drawing the support 200; and wherein the support 200 comprises a metal-core printed circuit board.

For instance, when using a MCPCB, the support may include a metal layer that is thermally conductive, such as an Al or a Cu layer.

As further shown in FIG. 2*b*, it may be desirable to introduce a discontinuity, indicated with reference 207, such that there may be no electrical contact between the electrically conductive track 203 at the first support part 211 and the second support part 212.

Hence, the first support part 211 and the second support part 212 may share a metal core, wherein the first support part 211 further comprises a dielectric layer 204 and one or more electrically conductive tracks 203, and (then) the method may comprise removing at least part of the one or more electrically conductive tracks 203, and optionally also at least part of the dielectric layer 204, on part of the support 200 that is to be deep-drawn into the second support part 212. This is schematically depicted in embodiments II and III in FIG. 2*b*. Thereafter, deep-drawing may take place, which is shown for embodiment III but which may of course also be executed after the stage shown in embodiment/stage III.

Optionally, further bending or deep-drawing may take place, as schematically depicted in embodiment/stage V in FIG. 2*b*. This may facilitate fixating the support 200 in the housing 300.

Hence, as shown e.g. in FIG. 2*b*, the first support part 211 and the second support part 212 share a metal core, wherein the first support part 211 further comprises a dielectric layer 204 and one or more electrically conductive tracks 203, and wherein at least part of the second support part 212 does not comprise one or more electrically conductive tracks 203.

In embodiments, at least part of the second support part 212 does not comprise the dielectric layer 204.

As shown in FIG. 2*b*, in embodiments the first support part 211 and the second support part 212 share a metal core, wherein the first support part 211 further and the second support part 212 comprise a dielectric layer 204 and one or more electrically conductive tracks 203, wherein at least part of the second support part 212 does not comprise one or more electrically conductive tracks 203, and wherein optional available electrically conductive tracks 203 are not electrically connected with the one or more electrically conductive tracks 203 comprised by the first support part 211, and wherein optionally a discontinuity is configured between the dielectric layer 204 of the first support part 211 and the second support part 212. Reference 205 indicates a solder mask. This solder mask 205 may partly be removed, e.g. via etching, and e.g. solder paste is provided (small hatched areas, indicated with references 209) for a functional coupling with the one or more conductive tracks 203.

As shown in FIG. 2*b*, the first support part 211 and the second support part 212 are configured under a first angle $\alpha$ selected from the range 35-350°.

Angle $\alpha$ may especially be the angle between the first support part and the second support part of the first face 217 of the support layer 219. This angle is 180 before deep-drawing. Angle R is especially be the angle between the first support part and the second support part of the second face 218 of the support layer 219. This angle is 180 before deep-drawing. With deep drawing, part of the second face 218 is drawn to another part of the second face, and the first support part and the second support part under an angle $\alpha$ unequal to 180 is obtained. Note that $\alpha+\beta$ may be 360°.

The length of the second support part 212 that extends from the first support part 211 may be in the order of about 0.5 mm up to about 8 cm.

Note that in embodiment V the second support may further be bent, e.g. by deep drawing. This may not necessarily have an impact on the angle $\alpha$ (and $\beta$). Such V-shaped feature as shown in embodiments V may also allow other fixations than via e.g. a press fit. For instance, this may allow a spring mounting option. Note that the invention is not limited to press fit options.

Hence, the second support part may essentially comprise a single facet (which may be curved), like e.g. embodiments IV and VII, or the second support part may comprise a plurality of facets, see FIG. 2*b*. Especially, such facets are all created via deep-drawing. Especial, the facet of the second support part closest to the first support part may define the angle $\alpha$ (and $\beta$).

As schematically depicted in FIG. 2*b*, the light generating device 1000 further comprising electronics 500, wherein the electronics 500 are physically coupled to the first support part 211 and functionally coupled to the light source 100, and wherein the electronics 500 comprise a driver and wherein the electronics 500 further optionally comprise a communication device for control of the light source 100.

As can be derived from the above, the electronics 500 may be configured to the support 200 before or after deep-drawing. The latter is especially shown by starting with embodiment VI. The dielectric layer 204, the one or more electrically conductive tracks 203, and the solder mask 205 may be removed, followed by deep-drawing. This results in embodiments VII (or V). Then the electrical components, such as the light source(s) 100 and optional other electronics 500 may be configured.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating device comprising:

(i) a light source, wherein the light source comprises a solid state light source, (ii) a support for the light source, (iii) a housing comprising a housing wall, and (iv) a thermally conductive element; wherein the support is a monolithic support, wherein the support comprises at least two support parts which are configured bent relative to each other, wherein a first support part of the at least two support parts is configured to support the light source, and wherein a second support part of the at least two support parts is associated to one or more of the housing wall and the thermally conductive element and configured in thermal contact with the thermally conductive element, wherein the support is thermally conductive;

wherein the second support part is in physical contact with the housing wall and/or the thermally conductive element;

wherein the second support part is configured in an interference fit with the thermally conductive element; and wherein at least part of the thermally conductive element has a shape conformal to a shape of the housing wall; and wherein the second support part is configured to be placed between the housing wall and the thermally conductive element.

2. The light generating device according to claim 1, wherein the support comprises a metal-core printed circuit board, and wherein the thermally conductive element comprises a heatsink.

3. The light generating device according to claim 1, wherein the second support part is in physical contact with the housing wall and the thermally conductive element.

4. The light generating device according to claim 3, wherein at least part of the thermally conductive element is in physical contact with the housing wall; and wherein the second support part is associated to the thermally conductive element via a press fit.

5. The light generating device according to claim 1, wherein the second support part is configured in an interference fit between the housing wall and the thermally conductive element.

6. The light generating device according to claim 1, wherein the support is a deep-drawn support.

7. The light generating device according to claim 1, wherein the first support part and the second support part share a metal core, wherein the first support part further comprises a dielectric layer and one or more electrically conductive tracks, and wherein at least part of the second support part does not comprise one or more electrically conductive tracks.

8. The light generating device according to claim 7, wherein at least part of the second support part does not comprise the dielectric layer.

9. The light generating device according to claim 1, wherein the first support part and the second support part are configured under a first angle selected from the range 35-350°.

10. The light generating device according to claim 1, further comprising electronics, wherein the electronics are physically coupled to the first support part and functionally coupled to the light source, and wherein the electronics comprise a driver, and wherein the electronics further comprise a communication device for control of the light source.

11. The light generating device according to claim 1, wherein the light source comprises a plurality of light sources, wherein the first support part has a circular shape, and wherein the first support part is configured to support the plurality of light sources; wherein the light generating device is a retrofit lamp.

12. A method for producing the light generating device according to claim 1, wherein the method comprises:

providing a light source, a support for the light source, a housing comprising a housing wall, and a thermally conductive element;

deep-drawing the support into the first support part and the second support part which are configured bent relative to each other;

associating the second support part to one or more of the housing wall and the thermally conductive element and configuring the second support part in thermal contact with the thermally conductive element; wherein the second support part is in physical contact with the housing wall and/or the thermally conductive element; wherein the second support part is configured in an interference fit with the thermally conductive element; and wherein at least part of the thermally conductive element has a shape conformal to a shape of the housing wall; and the second support part is configured to be placed between the housing wall and the thermally conductive element; and providing the light generating device.

* * * * *